UNITED STATES PATENT OFFICE.

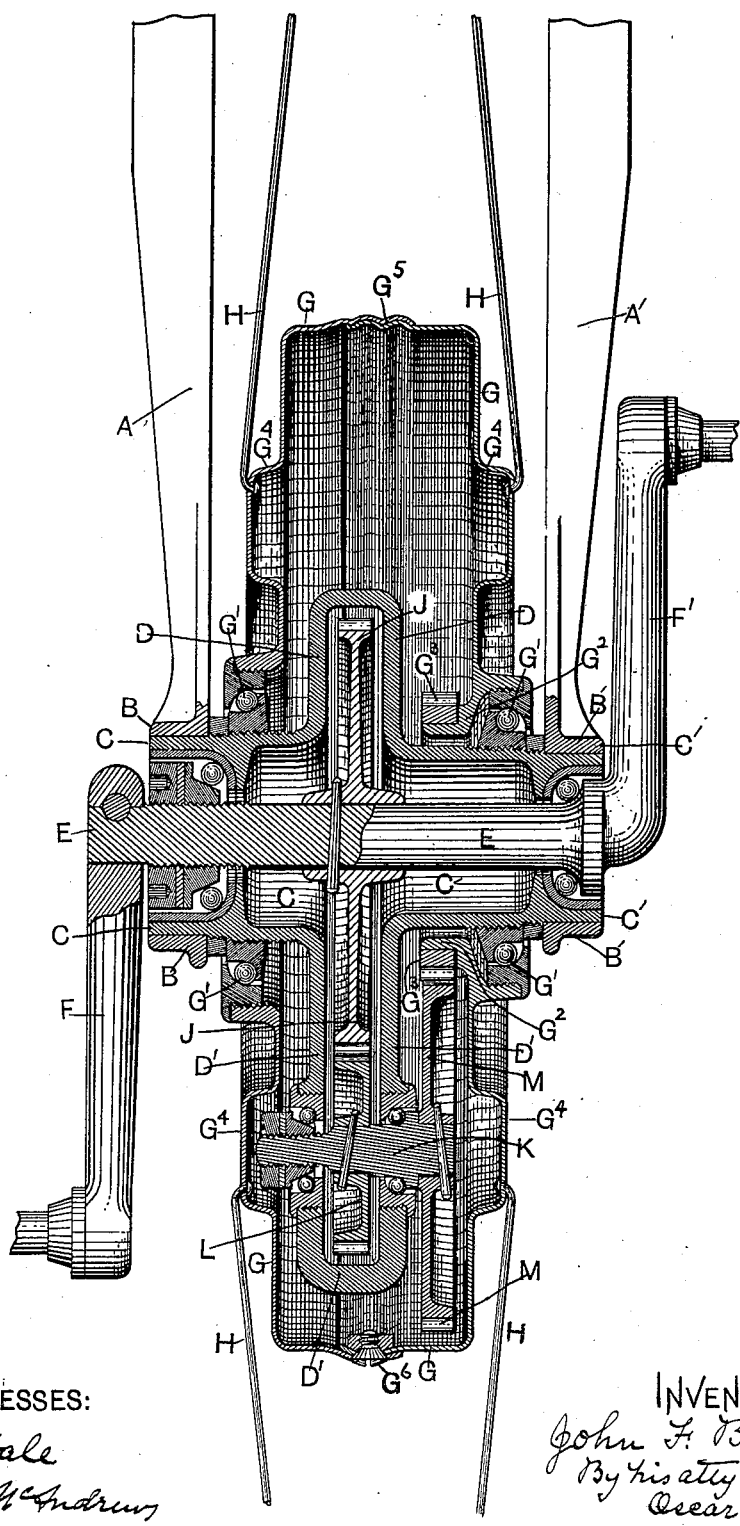

JOHN F. BRADY, OF CHICAGO, ILLINOIS.

BICYCLE-GEARING.

SPECIFICATION forming part of Letters Patent No. 641,365, dated January 16, 1900.

Application filed August 10, 1898. Serial No. 688,237. (No model.)

*To all whom it may concern:*

Be it known that I, JOHN F. BRADY, a citizen of the United States, residing at Chicago, in the county of Cook and State of Illinois, have invented a new and useful Bicycle-Gearing, of which the following is a specification.

My invention relates to gearing for the application of power to bicycles; and my object is to provide a construction in which a train of cog-gearing may operate within the boss portion of the drive-wheel in the manner and for the purpose particularly described hereinafter and illustrated in the accompanying drawing, in which is shown an axial vertical section of the drive-wheel boss, together with the stationary axle, which forms part of the frame of the bicycle and upon which axle the drive-wheel boss is mounted on ball-bearings. A train of four engaged spur-wheels is also shown in axial section to illustrate the connecting and multiplying gear between the crank-shaft, to which power is applied, and the boss of the drive-wheel. The other parts, in section and partly in section and elevation, are described hereinafter when necessary. Only the inner end portions of the spokes of the wheel are shown, the outer end portion, together with the rim and tire, not being shown in order to present a full-sized view of the operative within the boss of the drive-wheel, which, in all other parts, except what is shown in the drawing, may be of any ordinary construction.

The parts A and A' represent the reaches or braces of the frame of a bicycle and whose outer ends terminate in this instance in eyes B and B', shown in section, which are securely fastened at the outer end portions of the stationary axle, which connects and braces the outer ends of the parts A and A' of the frame, and this axle, consisting of two substantially cylindrical end portions C and C', connected at the inner ends, I will designate by the letters C and C' and the ends thereof by these letters separately. The opposite end portions C and C' of the axle are really integral with short and long U-shaped connections D and D', which are so formed and disposed that a clear space is left between the inner ends of the cylindrical end portions of the axles.

Disposed centrally through the hollow portion of axle C C' is a shaft E and is mounted on ball-bearings within the outer end portions of the axle. At the outer ends of shaft E are cranks F and F', to which power may be applied.

The boss G of the drive-wheel is a hollow casing of a substantially cylindrical shape and serves as the attachment for the inner ends of the spokes H and a dust-proof cover for the multiplying cog-gearing, with which it is directly connected as follows: Inside, at one of the side walls of boss G, around an axial hole therein, projects an annular rim at $G^2$, and upon the periphery of this rim is firmly secured or integral therewith a circle of cogs, forming a spur-wheel $G^3$.

Near the center of the length of shaft E is firmly secured a spur cog-wheel J, which has a position and is free to revolve between the cylindrical end portions C and C' of the axle and the U-shaped connections D and D'.

At K is a short shaft mounted on ball-bearings in the sides of the long U-shaped connection D', and between the sides of this connection is securely fastened to shaft K a spur cog-wheel L, which engages cog-wheel J. At the outer end of shaft K is firmly attached a spur cog-wheel M, which engages the cog-wheel $G^3$, attached to boss G.

At each side of boss G is an outward annular corrugation $G^4$, adapted to stiffen the sides when made of thin material and also for forming a convenient attachment for the inner ends of spokes H. Boss G in this instance comprises two lateral parts having peripheral rims which are spun to form screw-threads, as shown at $G^5$, whereby the parts may be screwed together, one into the other, to form a strong light hollow casing particularly adapted to the purpose intended. The parts of the boss are prevented from unscrewing in this instance by means of short screws, such as shown at $G^6$, which latter pass through the lapped portions of the periphery of the boss and engage with nuts fixed at the interior surface thereof, as shown. In operation it is obvious that, power being applied to revolve shaft E, the boss G, together with the other parts of the drive-wheel, will be revolved through the connection with cog-wheels $G^3$ and M, shaft K, and cog-wheels L and J.

I claim as my invention—

The combination with a frame, shaft and hollow axle comprising cylindrical end portions, and intermediate U-shaped portions, of a wheel provided with a metal hub, comprising two sections having interfitting rims, provided with spiral corrugations, annular corrugations extending from the side walls of the sections for the reception of the inner ends of the wheel-spokes, internal and external annular flanges projecting from one hub-section and surrounding the axle, ball-bearings intermediate of the external flange and axle, a gear-rim carried by the internal flange, a gear-wheel keyed upon the shaft and extending into the U-shaped portions of the axle, a short shaft journaled in one of the U-shaped portions of the hollow axle and projecting into one of the annular corrugations of the hub, and differential gear-wheels mounted upon said shaft upon the interior and exterior, respectively, of one of the U-shaped portions of the hollow axle and meshing with the gear-wheel and gear-rim respectively, and mechanism for actuating the shaft, substantially as specified.

In testimony that I claim the foregoing I have hereunto set my hand, this 4th day of August, 1898, in the presence of witnesses.

JOHN F. BRADY.

Witnesses:
E. CRILLEY,
T. W. HIGGINS.